United States Patent [19]

Lux et al.

[11] Patent Number: 5,231,956
[45] Date of Patent: Aug. 3, 1993

[54] PORTABLE HANDHELD WORK APPARATUS

[75] Inventors: Helmut Lux, Waiblingen-Bittenfeld; Lothar Ulrich, Schwaikheim, both of Fed. Rep. of Germany

[73] Assignee: Andreas Stihl, Waiblingen, Fed. Rep. of Germany

[21] Appl. No.: 16,078

[22] Filed: Feb. 10, 1993

[30] Foreign Application Priority Data

Feb. 11, 1992 [DE] Fed. Rep. of Germany ....... 4203885

[51] Int. Cl.⁵ .............................................. F01P 1/02
[52] U.S. Cl. ................................ 123/41.65; 123/41.7; 123/198 E; 55/437; 55/473
[58] Field of Search ............... 123/198 E, 41.65, 41.7; 55/394, 437, 473, DIG. 14

[56] References Cited

U.S. PATENT DOCUMENTS

| | | | |
|---|---|---|---|
| 3,994,067 | 11/1976 | Hazzard et al. | 123/41.65 |
| 4,261,302 | 4/1981 | Sheldon | 123/41.11 |

FOREIGN PATENT DOCUMENTS

3708289 9/1987 Fed. Rep. of Germany.

*Primary Examiner*—Noah P. Kamen
*Attorney, Agent, or Firm*—Walter Ottesen

[57] ABSTRACT

The invention is directed to a portable handheld work apparatus including a motor-driven chain saw, cutoff machine and the like. The work apparatus includes a housing and an internal combustion engine mounted in the housing for driving a work tool. The housing defines a space from which said engine draws combustion air and a fan wheel is disposed in the housing for generating a cooling-air flow which leaves the fan wheel in a direction tangential to the periphery of the fan wheel for cooling the engine. The housing has a U-shaped channel for conducting the cooling-air flow. The U-shaped channel is disposed so as to face toward the fan wheel with the base wall thereof being disposed at a predetermined spacing from the periphery of the fan wheel. The U-shaped channel has a pass-through formed in the base wall at a pregiven spacing downstream from the fan wheel for passing a portion of the cooling-air flow to the space as combustion air for the engine. The pass-through defines a plane and a center axis perpendicular to the plane. The U-shaped channel is configured to impart a predetermined direction of flow to the cooling-air flow at the region of the pass-through and the center axis and the predetermined direction of flow conjointly define an angle $\beta$ having a value in a range of approximately 70° to 180°.

15 Claims, 5 Drawing Sheets

PORTABLE HANDHELD WORK APPARATUS

BACKGROUND OF THE INVENTION

Published German patent application 3,708,289 discloses a work apparatus such as a chain saw wherein the cooling air is drawn in axially by a fan wheel. The cooling air is moved by the vanes of the fan wheel in a radial direction and flows via a cooling-air spiral in the direction toward the internal combustion engine. An air-guiding wall is disposed parallelly to the outlet diameter of the fan wheel and surrounds the inlet opening of an air channel extending in the rotational direction of the fan wheel and by means of which the combustion air is tapped into an air chamber. A considerable quantity of dirt particles is drawn in with the cooling air and the channel extends tangentially from the fan wheel in the direction of rotation. For these reasons, the dirt particles enter into the air channel and into the carburetor enclosure where they must be filtered by an air filter. An air filter of this kind will therefore become clogged with dirt particles very quickly and must be cleaned after a short operating time and, under some circumstances, even be exchanged.

SUMMARY OF THE INVENTION

It is an object of the invention to provide a work apparatus of the kind described above wherein the combustion-air flow tapped from the cooling-air flow is substantially free of coarse dirt particles in order to avoid the accumulation of dirt in the carburetor filter unit.

The invention is directed to a portable handheld work apparatus including a motor-driven chain saw, cutoff machine and the like. The work apparatus has a work tool for performing work on a workpiece and includes: a housing; an internal combustion engine for driving the work tool; the engine being mounted in the housing; the housing defining a space from which the engine draws combustion air required for the operation thereof; a fan wheel disposed in the housing and operatively connected to the engine for generating a cooling-air flow; the fan wheel having a plurality of vanes having outer respective tips defining a periphery from which the cooling-air flow leaves the fan in a direction tangential to the periphery for cooling the engine; the housing having a U-shaped channel for conducting the cooling-air flow; the U-shaped channel having two leg walls and a base wall which conjointly define a U-shaped opening; the U-shaped channel being disposed so as to face toward the vanes with the U-shaped opening and with the base wall being disposed at a predetermined spacing from the periphery; the U-shaped channel having a pass-through formed in the base at a pre-given spacing downstream from the fan wheel for passing a portion of the cooling-air flow to the space as combustion air for the engine; the pass-through defining a plane and a center axis perpendicular to the plane; the U-shaped channel being configured to impart a predetermined direction of flow to the cooling-air flow at the region of the pass-through; and, the center axis and the predetermined direction of flow conjointly defining an angle $\beta$ at said region having a value in a range of approximately 70° to 180°.

Because of the U-shaped channel, the air flow, which flows from the fan wheel out of the cooling-air spiral to the engine, is channeled whereby the turbulent flow is stabilized and an essentially unitary flow component is formed in the peripheral direction of the channel. The pass-through is arranged in the base of the channel and leads to the air space. This pass-through ensures a crossover of cooling air into the air chamber, because of the arrangement of the pass-through and the existing static air pressure. The dirt particles, which are carried along in the longitudinal direction of the channel, cannot undergo the directional change necessary to pass through the pass-through because of their high velocity component. Accordingly, they simply fly past the pass-through. The dimensions are so selected that even smaller dirt particles have such a track velocity at the operating rotational speed of the fan wheel which makes a change in direction for passing through the pass-through difficult. The combustion air entering via the pass-through is therefore substantially free of dirt particles so that the air filter provided can be configured for filtering out the finest dirt particles and does not become clogged by coarse dirt particles even over a longer operating duration.

If the pass-through is configured so as to be wider than its elevation measured in the direction of the cooling-air flow, then the mechanical separating action is very great.

According to another feature of the invention, the base of the U-shaped channel is made of two base sections lying at an angle to each other. In one embodiment, the base section rearward in the direction of the cooling-air flow is provided with the pass-through. The rearward base section then lies at an angle of less than 45° to the cooling-air flow direction whereby an entry of dirt particles is prevented.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
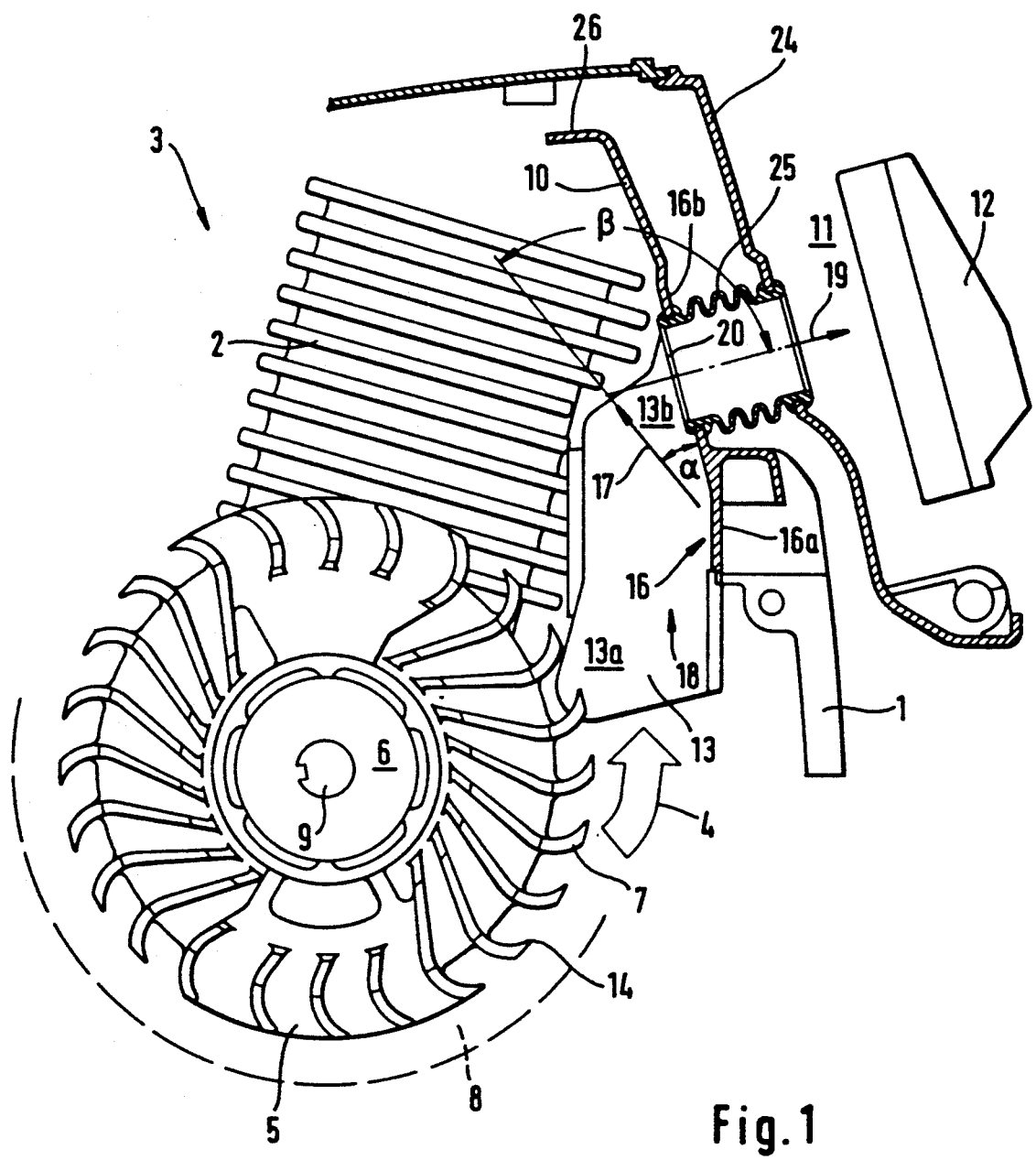
FIG. 1 is a schematic representation of a portion of an air-cooled internal combustion engine mounted in a housing of a work apparatus.

The housing portion 1 shown in FIG. 1 is of a shell-type construction and surrounds the cylinder 2 of an internal combustion engine 3. The portion of the housing shown guides a cooling-air flow 4 which is generated by a fan wheel 5. The cooling air enters via a central axial opening 6 into the fan wheel 5 and is moved via the vanes 7 approximately tangentially into a cooling-air spiral 8 from which the cooling-air flow 4 exits tangentially in the direction toward the cylinder 2 of the engine 3.

The fan wheel 5 is mounted at the one end 9 of the crankshaft of the engine 3 and is disposed next to the cylinder 2 as seen in the plan view of the engine 3.

The housing portion 1 includes a partition wall 10 which partitions the engine 3 from an air space 11 from where the engine draws the combustion air by suction through an air filter 12. The partition wall 10 supports an air-guide wall 13 lying approximately perpendicularly to the wall 10. The air-guide wall 13 extends in a plane between the end face of the fan wheel 5 facing toward the engine and the cylinder 2. The air-guide wall 13 is disposed close to the end face of the fan wheel 5 facing toward the engine 3. Preferably, a lower appendage 13a projects into the outlet diameter 14 of the fan wheel 5 viewed in the axial direction toward the fan wheel.

The air-guide wall 13 is disposed opposite a housing outer wall 15 at a predetermined spacing at least with respect to its section 13b which faces away from the fan wheel 5. The housing outer wall 15 is approximately perpendicular to the partition wall 10 and extends into a cover section 26 (FIG. 5) which covers the fan wheel 5 as shown in the plan view of the cylinder 2. The air-guide wall 13 and the housing outer wall 15 laterally delimit a radial U-shaped channel 18. The base 16 of the channel 18 is defined by a section of the partition wall 10 and this base is open toward the fan wheel 5. The base 16 of the channel is at a spacing with respect to the outlet diameter 14 of the fan wheel 5 and is, in the embodiment shown, subdivided into a forward section 16a and a rearward section 16b in the flow direction of the cooling air 4. As shown in the embodiment of FIG. 1, the base section 16b is rearward in the flow direction of the cooling air 4 and is bent off at an angle in the direction toward the cylinder 2. The rearward base section 16b defines an angle α with the flow direction 17 of the cooling air present in this region. The angle α can have a value up to 45°. In the embodiment shown, the angle α has a magnitude of approximately 30°. The channel 18 faces the openings of the U-shaped spaces between the vanes 7 of the fan wheel 5 so that the cooling-air flow leaving the cooling-air spiral 8 is conducted through the channel 18.

A pass-through 20 is provided in the base section 16b in the region of the end of the section 13b of the air-guide wall 13. The pass-through 20 is disposed at a spacing to the cover section 26 of the housing part 1. The pass-through 20 taps combustion air via the cover section 26 from the cooling-air flow 4 into the air space 11. The flow direction 19 of the combustion air and the flow direction 17 of the cooling air conjointly define an angle β which lies in the range of approximately between 70° to 180° and especially between 90° and 150°. In the embodiment shown, the angle β is 115°. The flow direction can also be perpendicular to the plane of the pass-through 20 so that in the embodiment shown in FIGS. 1 to 5, the perpendicular center axis of the pass-through 20 lies at an angle β of approximately 70° to 180° to the flow direction 17 of the moved cooling air.

Figure 2:
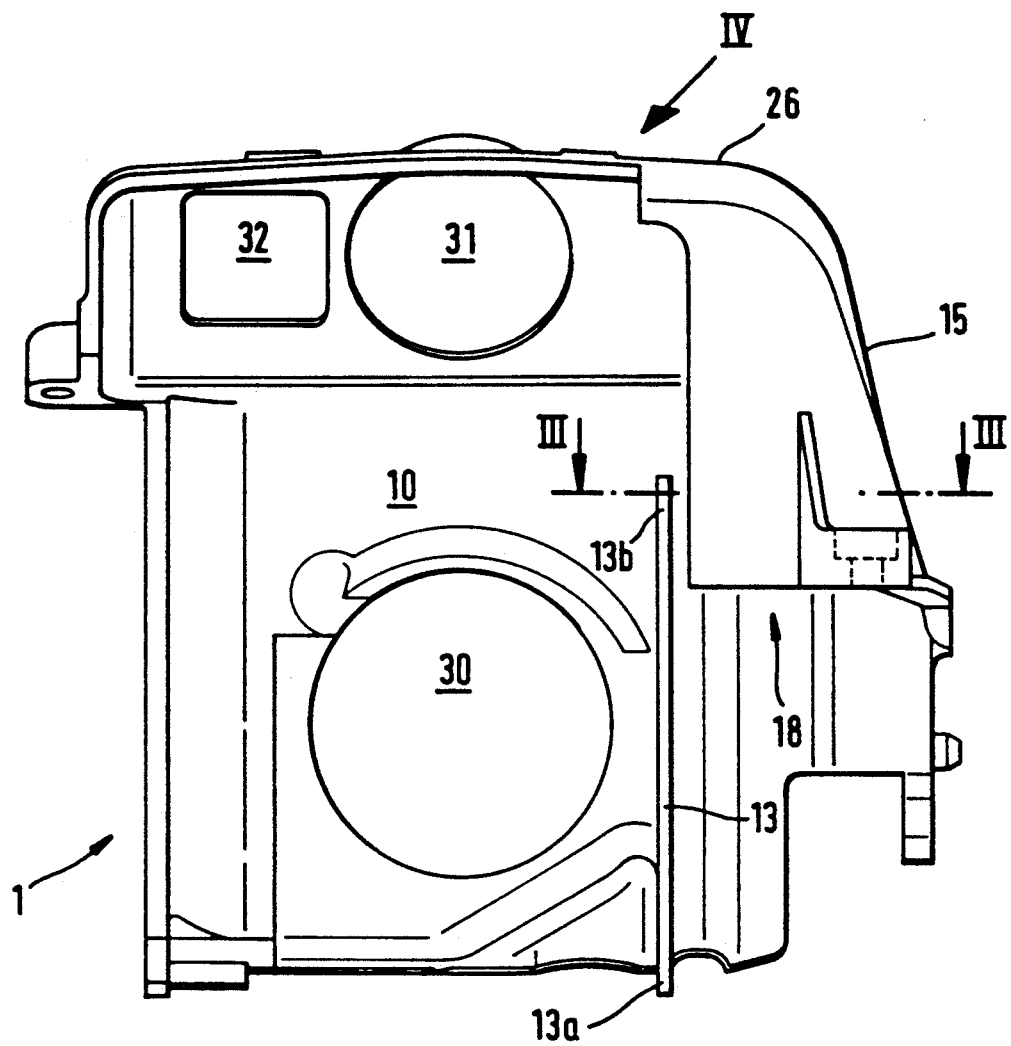
FIG. 2 is a plan view of the portion of the housing shown in FIG. 1 as viewed from the engine.
Figure 3:
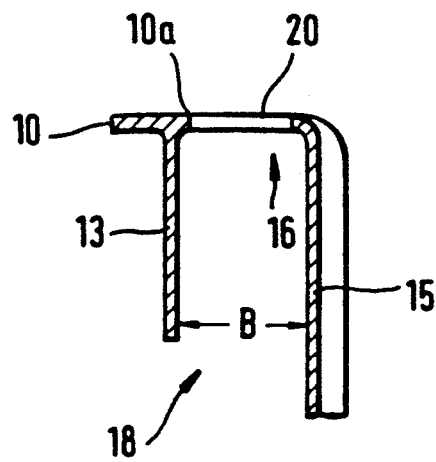
FIG. 3 is a section view taken along line III—III of FIG. 2.
Figure 4:
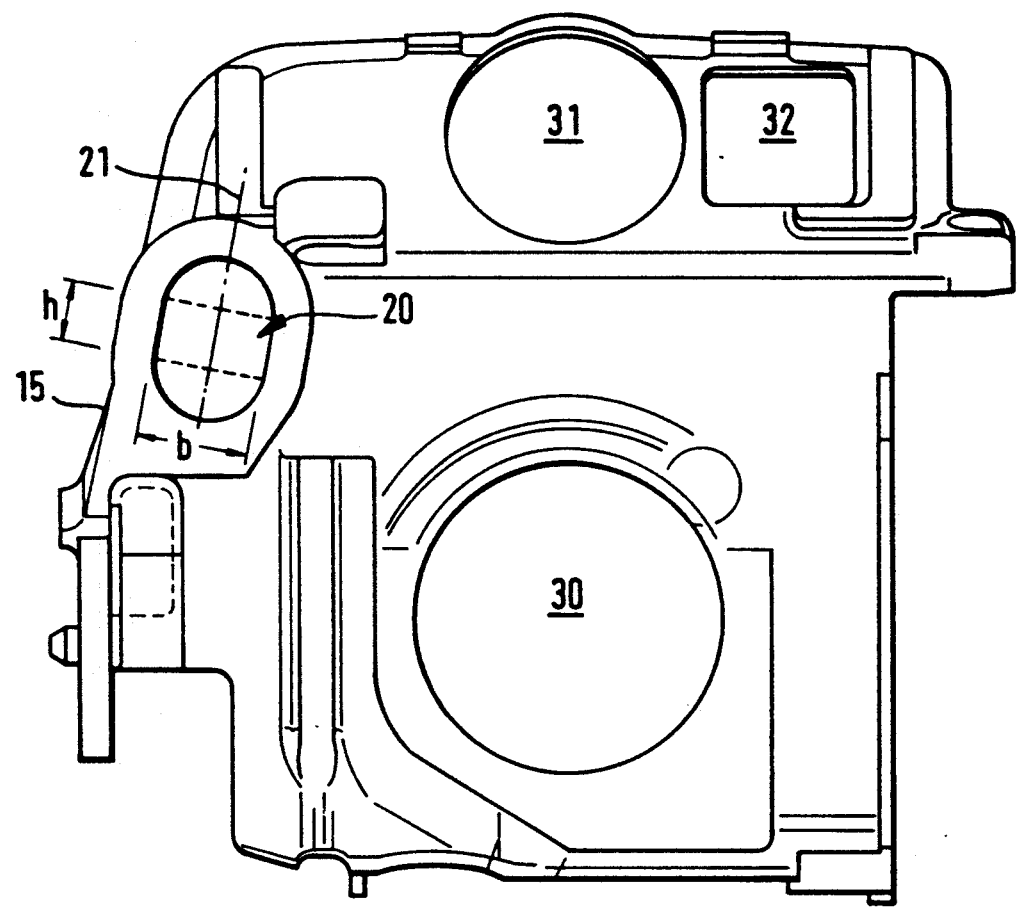
FIG. 4 is a view of the part of the housing viewed in the direction of arrow IV in FIG. 2.

The pass-through 20 extends essentially over the entire width B of the U-shaped channel 18 (FIG. 3) which advantageously tapers in the direction toward the pass-through 20 in order to increase the flow velocity. As shown in FIG. 1, the pass-through 20 can be at the elevation of the end of the air-guide wall 13 with the U-shaped channel 18 extending from the pass-through 20 in a direction opposite to the flow direction. The channel 18 extends up to approximately the elevation of the fan wheel 5 (FIG. 2). The cooling-air flow 4 is conducted by the U-shaped channel 18 in the direction toward the engine 3. In the region of the pass-through 20, the cooling air essentially has a flow direction 17 which lies at an angle α to the base section 16b. The flow at the velocity obtained by the channel guide of the cooling air also has dirt particles entrained. The dirt particles cannot make the directional change of the combustion air tapped in the direction 19 because of the track velocity imparted thereto. Therefore, the dirt particles fly past the pass-through 20. The channel 18 tapers in the direction toward the pass-through 20 in order to obtain an increased flow velocity of the dirt particles. The longitudinal center axis 21 of the pass-through 20 lies parallel to the housing outer wall 15 as shown in FIG. 4. In order to obtain a high dynamic separating action at the pass-through 20, it is preferable to configure the pass-through 20 to have a width (b) greater than its elevation (h) as shown in phantom outline in FIG. 4.

The shape of the pass-through can be rectangular, circular, oval, trapezoidal or can be configured to have any other suitable geometry.

Figure 5:
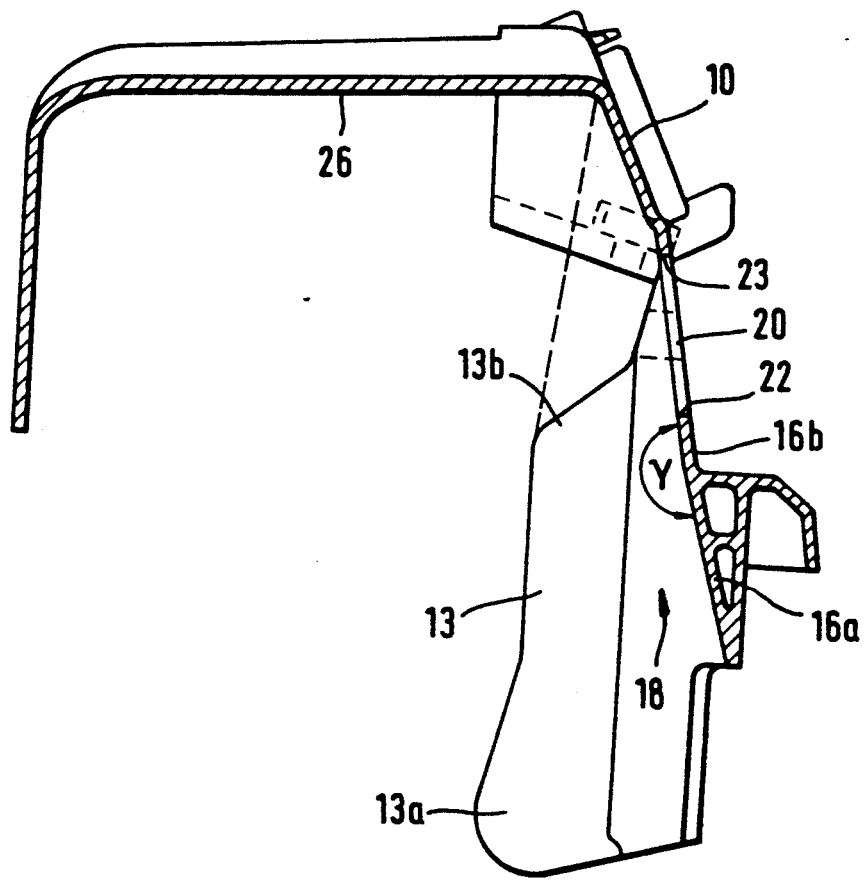
FIG. 5 is a section view corresponding to that shown in FIG. 1 but through a modified housing; and, FIG. 6 is a partial section view through a further embodiment of a housing of the kind shown in FIG. 1.

The edge 22 of the pass-through can project in the manner of a ramp into the channel 18 as shown in FIG. 5 in order to ensure that dirt particles, which fly past near the section 16a of the base 16, do not enter into the pass-through. The edge 22 is disposed forward in the flow direction of the cooling air. This is achieved in a simple manner in that the rearward section 16b of the base 16 and the forward section 16a of this base conjointly define an obtuse angle γ which opens toward the engine 3 at an angle of approximately 185°.

In FIG. 5, the air-conducting wall 13 is arranged perpendicularly to the partition wall 10 and is extended beyond the pass-through 20 up to the cover section 26 which positively influences the degree of separation. Preferably, the air-guide wall 13 extends pointedly outward to the tip of the cover section 26.

As shown in the plan view of FIGS. 2 and 4, an opening 30 is provided in the partition wall 10 to provide a connection of the carburetor arranged in the air space 11 with the engine 3. The circular opening 30 lies next to the U-shaped channel 18 below the pass-through 20. Cutouts 31 and 32 are provided above the opening 30 through which the spark plug or other apparatus of the engine 3 can be installed.

In FIG. 1, the housing part 1 is shown as an inner part of the entire housing and is surrounded by an outer housing 24. The channel for branching off the combustion air is defined by the bellows 25. The bellows 25 is snapped into the pass-through 20 and, at its other end, is seated in or snapped into an opening of the outer housing 24. It can also be advantageous to provide the housing part 1 itself as the outer housing.

Furthermore, it can be advantageous to substitute several individual openings for the pass-through 20 so that a lattice or the like is formed.

Figure 6:
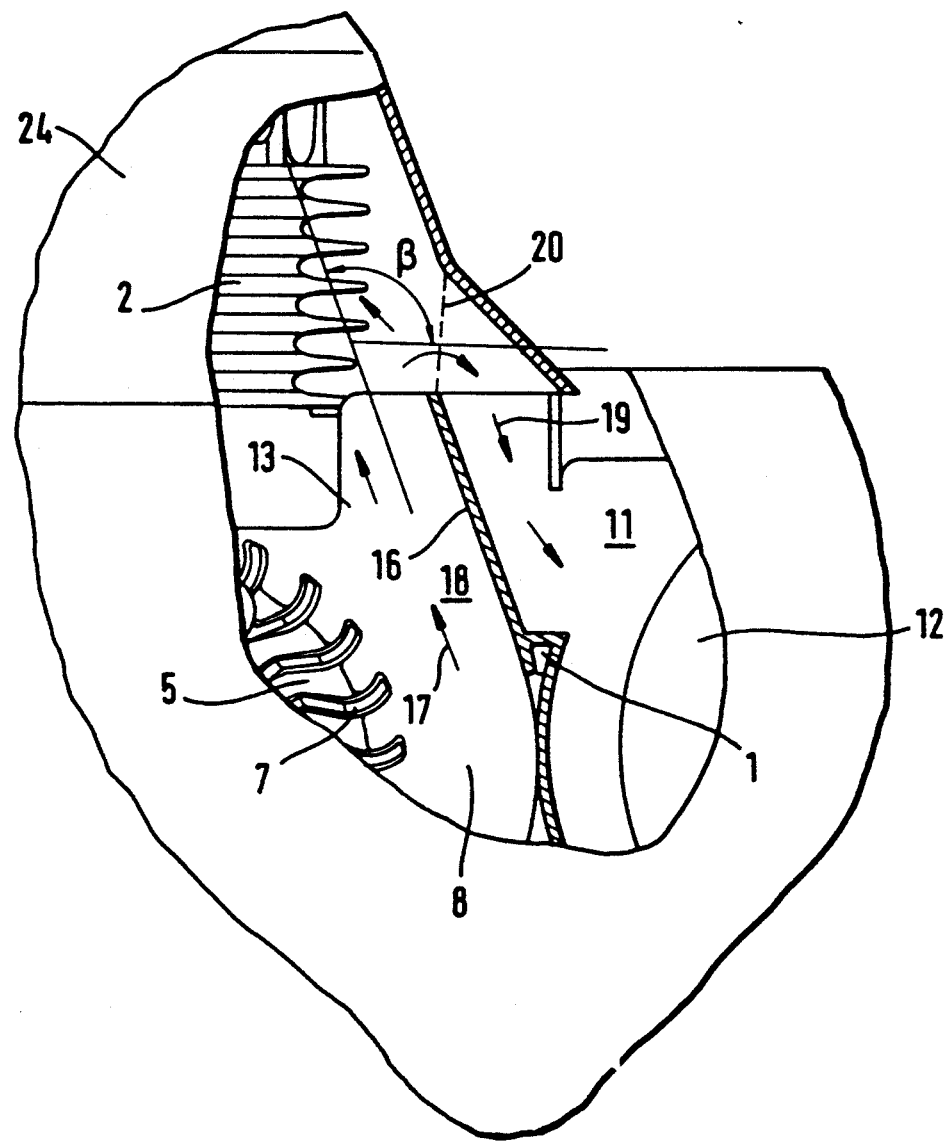

The housing part shown in the embodiment of FIG. 6 corresponds in its basic configuration to that shown in FIG. 1. For this reason, the same parts are identified by the same reference numerals. The configuration of FIG. 6 departs from that shown in FIG. 1 in that the channel for guiding the combustion air, which extends from the pass-through 20, leads in the opposite direction to the cooling-air channel 18. The combustion air must therefore flow through a detour of 180° to reach the air filter 12.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus including a motor-driven chain saw, cutoff machine and the like, the work apparatus having a work tool for performing work on a workpiece, the work apparatus comprising:
   a housing;
   an internal combustion engine for driving said work tool;
   said engine being mounted in said housing;
   said housing defining a space from which said engine draws combustion air required for the operation thereof;
   a fan wheel disposed in said housing and operatively connected to the engine for generating a cooling-air flow;
   said fan wheel having a plurality of vanes having outer respective tips defining a periphery from which the cooling-air flow leaves the fan in a direction tangential to said periphery for cooling said engine;
   said housing having a U-shaped channel for conducting the cooling-air flow;
   said U-shaped channel having two leg walls and a base wall which conjointly define a U-shaped opening;
   said U-shaped channel being disposed so as to face toward said vanes with said U-shaped opening and with said base wall being disposed at a predetermined spacing from said periphery;
   said U-shaped channel having a pass-through formed in said base wall at a pregiven spacing downstream from said fan wheel for passing a portion of said cooling-air flow to said space as combustion air for the engine;
   said pass-through defining a plane and a center axis perpendicular to said plane;
   said U-shaped channel being configured to impart a predetermined direction of flow to said cooling-air flow at the region of said pass-through; and,
   said center axis and said predetermined direction of flow conjointly defining an angle $\beta$ at said region having a value in a range of approximately 70° to 180°.

2. The portable handheld work apparatus of claim 1, said U-shaped channel having a width (B); and, said pass-through being formed in said channel so as to extend over said entire width (B) thereof.

3. The portable handheld work apparatus of claim 2, said pass-through having a width wider than said width (B).

4. The portable handheld work apparatus of claim 1, said pass-through having a height measured in said direction of flow and a width measured transversely to said direction of flow; and, said width being greater than said height.

5. The portable handheld work apparatus of claim 1, said U-shaped channel having forward and rearward channel segments; said forward and rearward channel segments having respective base wall segments extending one into the other in said direction of flow; and, said base wall segments conjointly defining an angle.

6. The portable handheld work apparatus of claim 5, said rearward base wall segment being downstream of said forward base wall segment viewed in said direction of flow; and, said pass-through being formed in said rearward base wall segment.

7. The portable handheld work apparatus of claim 6, said angle $\beta$ being a first angle and said angle conjointly defined by said base wall segments being a second angle; and, said second angle having a value of up to 45°.

8. The portable handheld work apparatus of claim 1, said pass-through having a forward edge viewed in said direction of flow; and, said forward edge being configured so as to jut forward in a ramp-like manner toward said fan wheel.

9. The portable handheld work apparatus of claim 1, said U-shaped channel extending over a portion of the region between said fan wheel and said pass-through.

10. The portable handheld work apparatus of claim 1, said fan wheel having a side facing toward said engine; and, one of said leg walls being disposed at said side of said fan wheel and extending to said periphery of said fan wheel.

11. The portable handheld work apparatus of claim 10, said one of said leg walls extending between said side of said fan wheel and said engine so as to overlap said one side of said fan wheel.

12. The portable handheld work apparatus of claim 10, said one leg wall being extended in said direction of flow beyond said pass-through.

13. The portable handheld work apparatus of claim 13, said one leg wall ending in a point when viewed in said direction of flow.

14. The portable handheld work apparatus of claim 10, said housing having a cover section disposed above said U-shaped channel; and, said one leg wall extending upwardly beyond said pass-through and up to said cover section.

15. The portable handheld work apparatus of claim 10, said housing having a wall defining the other one of said leg walls of said U-shaped channel.

* * * * *

UNITED STATES PATENT AND TRADEMARK OFFICE
CERTIFICATE OF CORRECTION

PATENT NO. : 5,231,956
DATED     : August 3, 1993
INVENTOR(S) : Helmut Lux and Lothar Ulrich It is certified that error appears in the above-identified patent and that said Letters Patent is hereby corrected as shown below:

In column 6, line 42, delete "13," and substitute -- 10, -- therefor.

Signed and Sealed this

Twenty-ninth Day of March, 1994

Attest:

BRUCE LEHMAN

Attesting Officer   Commissioner of Patents and Trademarks